United States Patent [19]

Schlitt et al.

[11] Patent Number: 4,511,850
[45] Date of Patent: Apr. 16, 1985

[54] SHORT PULSE FREE ELECTRON LASER AMPLIFIER

[75] Inventors: Leland G. Schlitt, Livermore; Abraham Szoke, Fremont, both of Calif.

[73] Assignee: The United States of America as represented by the United States Department of Energy, Washington, D.C.

[21] Appl. No.: 342,678

[22] Filed: Jan. 26, 1982

[51] Int. Cl.³ .............................. H01S 3/09; H01S 3/14
[52] U.S. Cl. ......................................... 330/4.3; 372/2; 372/69
[58] Field of Search ....................... 330/4.3; 372/2, 69, 372/92; 315/3, 3.5, 4, 5

[56] References Cited

U.S. PATENT DOCUMENTS

| | | | |
|---|---|---|---|
| 4,162,432 | 7/1979 | Schlitt | 372/74 |
| 4,225,649 | 1/1984 | Elias et al. | 372/2 |
| 4,287,488 | 9/1981 | Brau et al. | 372/2 |
| 4,323,857 | 4/1982 | Brau et al. | 372/69 |
| 4,337,413 | 6/1982 | Pontvranne | 315/3.5 |

OTHER PUBLICATIONS

Boehmer et al., "An Experiment on FEL ... Wiggler", 6/81, pp. 3156–3159, IEEE Trans. an Nuc. Sci., vol. NS-28, #3.
Prosnitz et al., "Preliminary Examination . . . FEL", 2/5/79, pp. 1–24, DE 82012042, Abst. Cited only.
Prosnitz et al., "One-Dimensional Computer . . . Radiation", 8/13/79, pp. 571–587, ISBN-0-201-05687-9, Abstract Cited only.

*Primary Examiner*—Nelson Moskowitz
*Attorney, Agent, or Firm*—John F. Schipper; Charles E. Lykes, Jr.; Judson R. Hightower

[57] ABSTRACT

Method and apparatus for amplification of a laser pulse in a free electron laser amplifier where the laser pulse duration may be a small fraction of the electron beam pulse duration used for amplification. An electron beam pulse is passed through a first wiggler magnet and a short laser pulse to be amplified is passed through the same wiggler so that only the energy of the last fraction, f, ($f<1$) of the electron beam pulse is consumed in amplifying the laser pulse. After suitable delay of the electron beam, the process is repeated in a second wiggler magnet, a third, . . . , where substantially the same fraction f of the remainder of the electron beam pulse is consumed in amplification of the given short laser pulse in each wiggler magnet region until the useful electron beam energy is substantially completely consumed by amplification of the laser pulse.

3 Claims, 5 Drawing Figures

SHORT PULSE FREE ELECTRON LASER AMPLIFIER

The United States Government has rights in this invention, pursuant to Contract W-7405-ENG-48 between the U.S. Department of Energy and the University of California Lawrence Livermore National Laboratory.

FIELD OF THE INVENTION

The invention relates to amplification of short pulse electromagnetic radiation using free electron laser techniques.

BACKGROUND OF THE INVENTION

The possibility of amplifying coherent electro-magnetic radiation, by collinear passage of the radiation and of a relativistic electron beam through a sequence of electric or magnetic fields of alternating polarity, has been recognized since the first publication by H. Motz, Journal of Applied Physics 22 527 (1950) on the subject. Motz considered a sequence of alternating direction magnetic fields, regularly spaced and transversely oriented relative to the common direction of travel of a light beam and an electron beam. Let $L_o$ be the fundamental period of variation of direction of the sequence of transverse magnetic fields and let the beam electrons move with velocity $v \simeq c$. The light beam photons will be absorbed and re-emitted by the electrons, and the frequency $\nu$ of emitted radiation will depend upon angle of observation $\theta$ relative to the common beam direction according to $\nu = v/L_o(1-\cos\theta)$. For a highly relativistic electron beam and modest transverse magnetic field strengths, most of the radiation appears in the forward direction, in a narrow cone of half angle of the the order of $\Delta\theta = m_e c^2/E_b$ where $$E_b = m_e c^2 / \sqrt{1 - \frac{v^2}{c^2}}$$

is the electron total energy.

Motz, Thon and Whitehurst, in Jour. of Appl. Phys. 24 826 (1953), further considered the co-propagating light beam and electron beam in a waveguide, obtained some interesting general classical relativistic relationships for electron orbits in a spatially varying B-field, and reported the experimental observation of visible and millimeter wavelength radiation for field strengths $B \simeq 3{,}900$ and 5,600 Gauss.

In *Proceedings of the Symposium on Millimeter Waves* (Polytechnic Press, Brooklyn, 1960) p. 155, Motz and Nakamura analyzed the amplification of a millimeter wavelength electromagnetic wave interacting with a relativistic electron beam in the presence of a rectangular waveguide and a spatially oscillatory electric field, using a model of J. R. Pierce. The analysis was purely classical, and the gain was rather modest.

Pantell, Soncini and Puthoff discuss some initial considerations on stimulated photon-electron scattering in I.E.E.E. Journal of Quantum Electronics QE-4 905 (1968). Collinear scattering, with the incident photon energy $h\nu$ being $<<$ incident electron energy $E_{el}$ and periodic deflection of the electron beam by a microwave radiation field, is analyzed briefly; and a Compton scattering laser is proposed, using the input/output wavelength relation $$\nu_{out} = 4\left(\frac{E_{el}}{m_e c^2}\right)^2 \nu_{in}.$$

Useful gain from the device appears to be limited to the middle-high infrared range $\lambda \geq 20 \ \mu m$.

Mourier, in U.S. Pat. No. 3,879,679, discloses a Compton effect laser that proceeds from the same principles as Pantell et al, supra. This invention, like that of Pantell et al, appears to require provision of an electron storage ring or the like for rapidly moving electrons and an optical cavity that is a part of the ring, for causing electron-photon scattering.

R. M. Phillips, in I.R.E. Transactions on Electron Devices, 231 (October 1960), used a periodic magnetic field, whose period may vary, to focus and axially bunch an electron beam traveling in an unloaded waveguide, together with a monochromatic light beam, to increase electron beam kinetic energy at the expense of light beam energy. The electron beam velocity was adjusted so that a beam electron travels one period L along its trajectory in the time required for the light beam (of wavelength $\lambda$) to travel a distance $L+\lambda$. The electron then senses only the retarding portion or only the accelerating portion of the electromagnetic wave. This approach converts transverse momentum, arising from the presence of the electromagnetic wave, into changes in axial momentum of the electron beam so that beam bunching occurs. Peak efficiency was about 10 percent for the experiments reported.

J. M. J. Madey, in Journal of Applied Physics 42 1906 (1971), discusses stimulated emission of bremsstrahlung by a relativistic electron into a single electromagnetic mode of a parallel light beam, where both electron and light beam move through a periodic, transverse d.c. magnetic field. Quantum mechanical and semi-classical calculations of transition rates and gain indicate that finite, practical gain is available in the infrared and visible portions of the optical spectrum. These considerations are incorporated in U.S. Pat. No. 3,822,410, issued to Madey for tunable apparatus for generation/amplification of coherent radiation in a single or a few closely spaced electromagnetic modes.

Hirschfield, in U.S. Pat. No. 3,398,376 for a relativistic electron cyclotron maser, discloses and claims use of an axial, monoenergetic relativistic electron beam ($E_{kinetic} \simeq 5$ keV) a spatially-varying longitudinal magnetic field coaxial with the beam, a weaker, transverse periodic electric or magnetic with a resulting helical pitch matching that of the electron motion at the predetermined beam velocity and a cavity resonator with a mode frequency matching that of the cyclotron frequency of the resulting spiraling electrons. The apparatus relies upon electron cyclotron radiation and ignores any synchronization of electron beam and the electromagnetic beam to be amplified.

A combination free electron laser/gas with high pulse repetition rates is taught by U.S. Pat. No. 4,187,686, issued to Brau, Rockwood and Stern. In the embodiment disclosed, the free electron laser operates at infrared wavelengths and the gas laser operates at ultraviolet wavelengths. The monoenergetic electron beam is initially bunched and accelerated to $\simeq 10$ MeV kinetic energy and directed into and out of a multiplicity of serially arranged free electron lasers by turning magnets positioned at the ends of these lasers; finally, the electron beam is directed axially through a gas laser to utilize and convert additional electron beam energy to electromagnetic energy. The free electron laser appears to be of conventional form, utilizing fixed period magnetic fields to produce electron bremsstrahlung radiation and an optical resonator for light beam amplification.

SUMMARY OF THE INVENTION

An object of the invention is to provide method and apparatus for amplification of short laser pulses by a free electron laser amplifier, using no complex optics or beam switching.

Additional objects, novel features and advantages thereof are set forth in the detailed description, with reference to the accompanying drawings, and may be realized by means of the instrumentalities and combinations pointed out in the appended claims.

To achieve the foregoing objects in accordance with the subject invention, as broadly described herein, the method may comprise the steps of: providing a short laser pulse of time duration $\tau_L$ and electron beam pulse of longer time duration $\tau_B = N\tau_L$, where N is a positive integer greater than one; providing N wiggler magnets in a linear array; passing the electron beam pulse and the laser pulse through the first wiggler magnet so that the laser pulse and the last segment $\Delta t = \tau_L$ $((N-1)\tau_L \leq t \leq N\tau_L)$ of the electron beam pulse pass through the first wiggler magnet at substantially the same time; delaying the electron beam pulse by a time interval $\tau_L$ relative to the laser pulse; passing the electron beam and the laser pulse through the second wiggler magnet so that the laser pulse and the last remaining portion $\Delta t = \tau_L$ $((N-2)\tau_L \leq t \leq (N-1)\tau_L)$ pass through the second wiggler magnet at substantially the same time; and repeating the combination of electron beam pulse delay and simultaneous passage of laser pulse and last remaining portion of electron beam through a wiggler magnet $N-2$ additional times so that the laser pulse serially extracts energy from consecutive portions of the electron pulse and is thereby amplified without complex optics or beam switching as required in the prior art.

The apparatus may comprise: a source to produce an electron beam of predetermined temporal duration $\tau_B = N\tau_L$ where $\tau_L$ is the temporal duration of the laser pulse to be amplified and N is a positive integer (N>1); N wiggler magnets, arranged in a linear array with adjacent magnets being spaced apart by a substantially constant distance, with the linear array of magnets being positioned to receive an electron beam produced by the source and to receive the laser pulse; and $N-1$ electron beam delay lines, one being positioned between each adjacent pair of wiggler magnets to delay an electron beam by a predetermined time interval $\tau_L$ relative to a co-propagating light wave.

BRIEF DESCRIPTION OF THE DRAWINGS

The accompanying drawings illustrate one embodiment of the invention and, together with the detailed description, serve to explain the principles of the invention.

DETAILED DESCRIPTION OF THE PREFERRED EMBODIMENT

Figure 1:
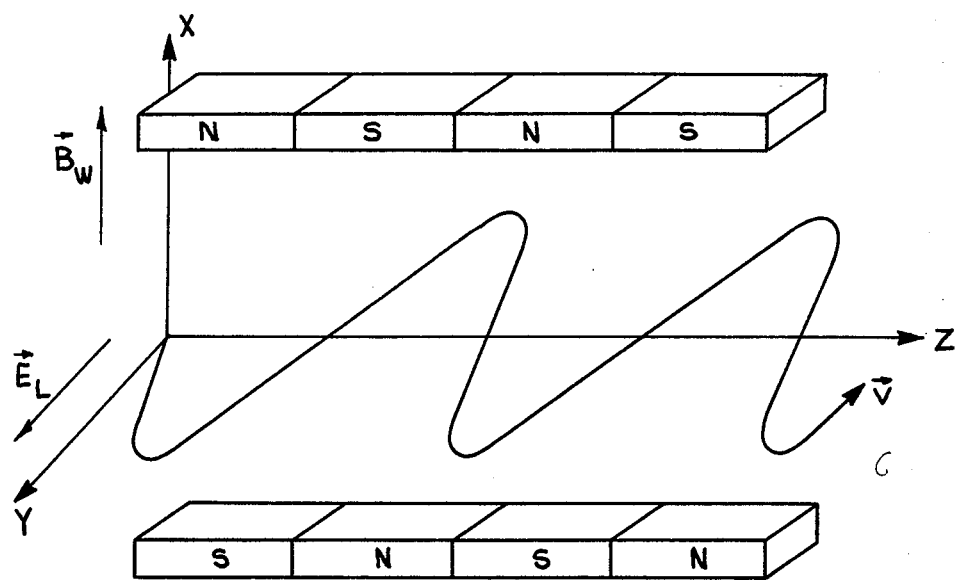
FIG. 1 is a schematic view of a wiggler magnet region that may be used in a free electron laser system to exchange energy between a relativistic electron beam (represented by the curved trajectory V) and a laser pulse having a direction of polarization parallel to E and propagating along the Z axis by means of the intermediary, spatially periodic magnetic field B.

A free electron laser (FEL) directly converts part of the kinetic energy of a high quality, relativistic electron beam into coherent amplification energy of a co-moving laser beam of appropriate frequency. Referring to FIG. 1 of the drawings, a free electron laser amplifier comprises an electron beam, an input laser beam and a spatially varying periodic magnetic field through which both the electron beam and the laser beam pass. The transversely directed wiggler magnetic field $B_w$ imparts to the electrons a component of velocity v parallel to the laser electric field so that the laser field $E_L$ may absorb energy from the electron beam continually, thus providing a laser amplification device. This continuous energy transfer requires that the wiggler magnet be designed so that it operates as a stable phase decelerator through continuous modification of the magnetic field period and/or strength as the electron beam decays.

Figure 2:
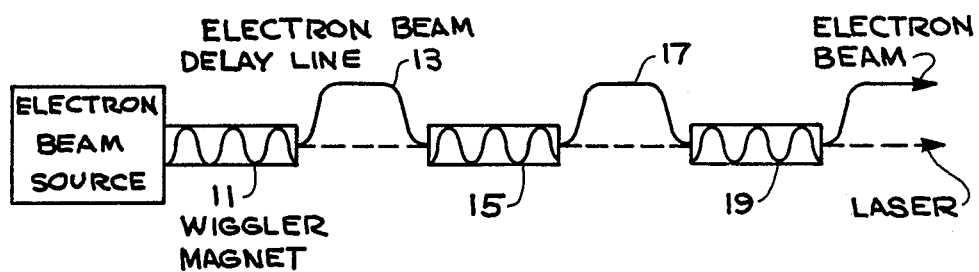
FIG. 2 is a schematic view of one embodiment of the subject invention, whereby wiggler magnet regions and electron beam delay lines alternate with one another in a substantially linear array.

As indicated schematically in FIG. 2, the subject invention allows one to efficiently amplify a short laser pulse in a FEL amplifier, even if the laser pulse time duration is only a small fraction of the time duration of the electron beam pulse, without resorting to high speed electron beam switches (which are wasteful of power) or complex laser pulse stacking optics. One begins with a laser pulse of time duration $\tau_L$ and a relativistic beam pulse of time duration $\tau_B = N\tau_L$, where N is a positive integer greater than one. One then arranges n wiggler magnets (11, 15, 19, ...) and $N-1$ electron beam delay lines (13, 17, ...) in an alternating pattern and a substantially linear array.

Figure 3:
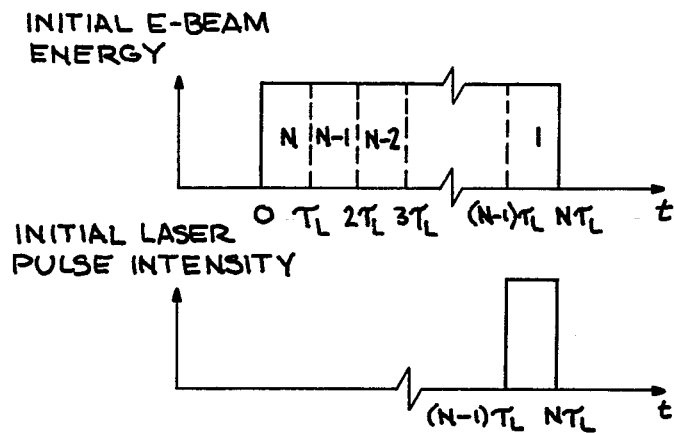
FIG. 3 is a two-part graphic representation showing the temporal relationship between the initial electron beam energy envelope and the initial laser pulse intensity envelope as they pass simultaneously through the first wiggler magnet.
Figure 4:
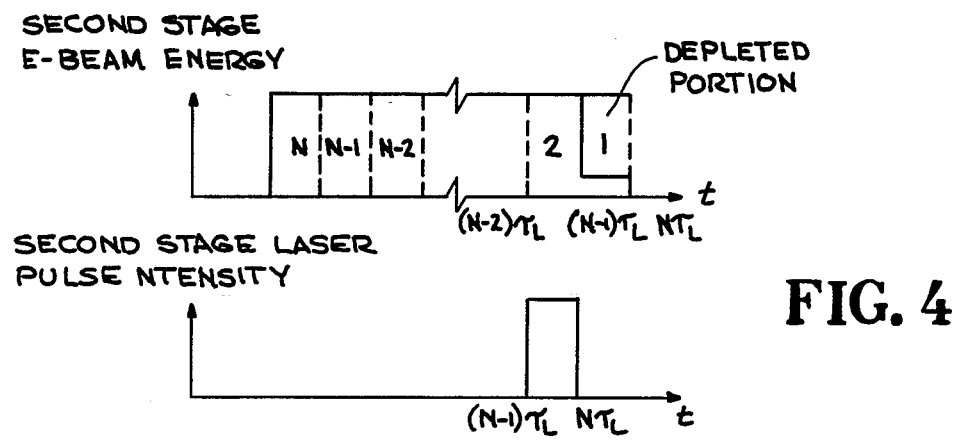
FIG. 4 is a two-part graphic representation showing the temporal relationship between the electron beam energy envelope and the laser pulse intensity envelope as the electron beam and the laser pulse pass simultaneously through the second wiggler magnet.

FIG. 3 shows the temporal relationship of the electron beam energy content and the laser pulse intensity as electron beam and laser beam enter the first wiggler magnet. The first portion $\Delta t_1 = (N-1)\tau_L$ of the relativistic electron beam pulse is allowed to pass through the first wiggler magnet 11 with no laser pulse present. The last portion $\Delta t_2 = \tau_L$ of the electron beam pulse passes through the wiggler magnet 11 in timed relationship with the passage of the laser pulse so that the laser pulse extracts energy (only) from this last portion of the electron beam according to FEL principles.

The temporal relationship of the electron beam energy and the laser pulse intensity as these two pass through the second wiggler magnet 15 is shown in FIG.

4. The electron beam then passes through a first electron beam delay line 13 and is delayed by a time interval $\tau_L$ relative to the laser pulse (undelayed), and the electron beam and laser beam then pass into a second wiggler magnet (FIG. 2). As the electron beam has been delayed by a time interval $\tau_L$ relative to the laser beam, the first portion $\Delta t = (N-2)\tau_L$ of the remaining electron beam pulse passes through the second wiggler magnet with no laser pulse present; and the last energetic portion $\Delta t_4 = \tau_L$ of the electron beam pulse passes through the magnet 15 together with the laser pulse (also of time duration $\tau_L$) so that once again the laser pulse extracts energy (only) from this last energetic portion of the electron beam.

Figure 5:
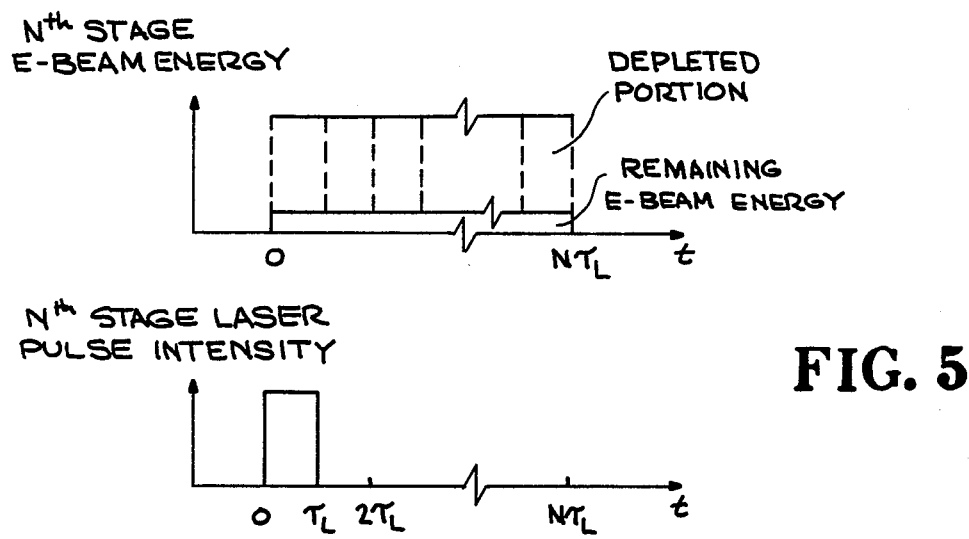
FIG. 5 is a two-part graphic representation showing the temporal relationship between electron beam energy envelope and laser pulse intensity envelope at the $N^{th}$ wiggler magnet.

As indicated in FIG. 5, the process of electron beam delay-laser pulse/electron beam interaction within the wiggler magnet, is then repeated an additional $N-2$ times until each segment of length $c\Delta t = c\tau_L$ of the electron beam pulse has been substantially absorbed in amplification of the laser pulse, producing an electron beam energy pattern at the output of the $N^{th}$ wiggler magnet substantially as shown in FIG. 5. With this approach, one can reduce the temporal duration $\tau_L$ of the pulse to be amplified to 20 nanoseconds or less.

The wiggler magnets may be of conventional design, with wiggler magnetic fields $B_w$ of 1–5 kiloGauss and associated wiggler wavelength of perhaps $\lambda_w \approx 1$–100 cm; all N such magnets should be substantially identical. The length of each such magnet will be determined by other considerations such as desired conversion efficiency.

The electron beam delay lines may each utilize a combination of magnetic fields (between consecutive wiggler magnets) to divert the electron beam, direct it through a circuitous path to introduce the appropriate time delay, and return the electron beam to the longitudinal axis of the next wiggler magnet for further interaction with another segment of the optical beam to be amplified. One possible problem here is that the "tired" electrons (those that have previously interacted most strongly with the optical beam and hence have suffered the largest kinetic energy decrease) will move along an arc with a smaller instantaneous Larmor radius (for constant magnetic field) than will a beam electron with higher kinetic energy. However, maintenance of phase relationships among the diverted beam electrons is apparently not a problem.

No complex optics such as pulse stacking are required with this approach, only passive electron beam optics are used for the wiggler magnets and electron beam delay lines, and no power-hungry beam switching is used. Two disadvantages of this system are that N wiggler magnets are required, which must be temporally synchronized, and that the laser radiation itself must propagate through the N wiggler magnet regions.

Although the preferred embodiment of the invention has been shown and described herein, variation and modification may be made without departing from what is regarded as the scope of the invention.

We claim:

1. Apparatus for amplification of a short laser pulse of temporal duration $\tau_L$, the apparatus comprising:

an electron beam source to produce an electron beam of temporal duration substantially $\tau_B = N\tau_L$, where N is a positive integer larger than one;

N wiggler magnets, arranged in a linear array, with adjacent magnets being spaced apart by a substantially constant distance and with the linear array being positioned to receive an electron beam produced by the electron beam source and to receive the laser pulse;

$N-1$ electron beam delay lines, with the $k^{th}$ delay line ($k=1, 2, \ldots N-1$) being positioned between the $k^{th}$ and the $(k+1)^{th}$ wiggler magnet, with each delay line being arranged to delay an electron beam by a predetermined time interval of substantially $\tau_L$, relative to a co-propagating light wave, as the electron beam moves from the $k^{th}$ wiggler magnet to the $(k+1)^{th}$ wiggler magnet.

2. Apparatus according to claim 1, wherein said temporal duration $\tau_L$ is at most 20 nanoseconds.

3. A method of amplification of a short laser pulse, the method comprising the steps of:

providing a laser pulse of time duration $\tau_L$ and an electron beam pulse of time duration substantially $\tau_B = N\tau_L$, where N is a positive integer greater than one;

providing N wiggler magnets in a substantially linear array;

passing the electron beam pulse and the laser pulse through the first wiggler magnet in timed relationship with one another so that the laser pulse and the last portion $\Delta t = \tau_L((N-1)\tau_L \leq t \leq N\tau_L)$ of the electron beam pulse pass through the first wiggler magnet at substantially the same time;

delaying the electron beam pulse by a time interval $\tau_L$ relative to the laser pulse;

passing the electron beam and the laser pulse through the $k^{th}$ wiggler magnet (with $k=2$) in timed relationship with one another so that the laser pulse and the portion of the electron beam corresponding to $(N-k)\tau_L \leq t \leq (N-k+1)\tau_L$ (with $k=2$) pass through the $k^{th}$ wiggler magnet (with $k=2$) at substantially the same time; and repeating the combination of the preceding two step $N-2$ additional times (corresponding to $k=3, 4, \ldots, N$), whereby the laser pulse extracts energy from successive portions of the electron beam and is thereby amplified.

* * * * *